US008276870B2

(12) United States Patent
Huang et al.

(10) Patent No.: US 8,276,870 B2
(45) Date of Patent: Oct. 2, 2012

(54) HANGING STRUCTURE

(75) Inventors: Wen-Hung Huang, Tucheng (TW); Stephen Tsai, Xizhi (TW)

(73) Assignee: Hannspree, Inc., Taipei County (TW)

( * ) Notice: Subject to any disclaimer, the term of this patent is extended or adjusted under 35 U.S.C. 154(b) by 148 days.

(21) Appl. No.: 12/926,987

(22) Filed: Dec. 22, 2010

(65) Prior Publication Data
US 2012/0061541 A1 Mar. 15, 2012

(30) Foreign Application Priority Data
Sep. 9, 2010 (TW) .............................. 99130540 A

(51) Int. Cl.
*A47G 1/24* (2006.01)

(52) U.S. Cl. ............. 248/496; 248/495; 40/753; 40/748

(58) Field of Classification Search .................. 248/495, 248/496, 490, 489, 685, 686, 691, 323, 324, 248/223.41, 224.51, 224.61, 225.11; 211/192; 403/348, 349, 353, 327, 330; 40/748, 753, 40/757
See application file for complete search history.

(56) References Cited

U.S. PATENT DOCUMENTS

| 2,696,962 | A | * | 12/1954 | Goss .............................. 248/477 |
| 4,101,043 | A | * | 7/1978 | Johnson et al. ................ 215/399 |
| 4,283,038 | A | * | 8/1981 | Kurtz ............................. 248/478 |
| 4,340,199 | A | * | 7/1982 | Brock ........................... 248/544 |
| 4,436,269 | A | * | 3/1984 | Dirksing et al. .............. 248/214 |
| 6,595,379 | B1 | * | 7/2003 | Powell .......................... 211/192 |
| 2012/0153107 | A1 | * | 6/2012 | Edwards ................. 248/223.41 |

* cited by examiner

Primary Examiner — A. Joseph Wujciak, III
(74) Attorney, Agent, or Firm — Bacon & Thomas, PLLC

(57) ABSTRACT

A hanging structure includes a back bezel recessed with a bezel recess, a first hanging member, and a second hanging member. The first hanging member movably arranged in the bezel recess includes an ear-shaped hanging part which is axially recessed with an accommodating hole with a first guiding path at side face. The first guiding path includes an axial segment and two positioning notches obliquely extending from the axial segment. The second hanging member movably arranged in the accommodating hole includes a main body and a mushroom-shaped hanging part. The main body, at its surface, includes a guiding protrusion which is movably arranged in the first guiding path of the first hanging member. The mushroom-shaped hanging part selectively extends out of the accommodating hole depending on which positioning notch the guiding protrusion moves into. Therefore, the hanging structure has various hanging modes to be selected.

7 Claims, 11 Drawing Sheets

HANGING STRUCTURE

BACKGROUND OF THE INVENTION

1. Field of the Invention

The present invention relates to a hanging structure, and more particularly, to a hanging structure for an electronic apparatus such as an LCD display.

2. Description of Related Art

In the past when people purchase television (TV) sets, the size of the TV screen was the main consideration. Large TV set occupies a large space in a room, and a TV cabinet is bulky and often affects the interior design. With the advance of the technology, electronic devices have become thinner and lighter. This is also true for home appliances. For instance, nowadays the flat displays such as LCD TVs, LED TVs, plasma TVs and the like have been introduced to the market. The TV set has led this trend.

With the introduction of the flat display TV, the TV set no longer is limited to being placed on a TV cabinet. It can now be matched with the interior design, and be set in or hung on a wall. Reference to a hanging apparatus for hanging a flat display on the wall can be found in Taiwan patent publication No. 537477. Referring to FIG. 1, a perspective view of a prior art display hanging structure; to hang a flat display 90 on the wall, first, a mounting rack 91 has to be mounted on the wall where the flat display 90 is to be hung. The mounting rack 91 has at least two mounting holes 92. Two independent hanging, docks 93 are fastened to the back side of a display case 901 through screws, the hanging docks 93 are secured corresponding to the two mounting holes 92 position. Then the hanging members 931 of the hanging docks 93 may be hung on the mounting holes 92 to hang the flat display 90 on the mounting rack 91.

Referring to FIG. 2, another prior art display hanging structure according to Taiwan patent No. M278990; it can be seen in the drawing that two specific hanging devices 96 are installed on the back side of the case 941 of an electronic apparatus 94, and correspondingly hung onto mounting holes 97 of a mounting rack 95. The disclose features that the hanging device 96 includes an movable support post 961 which is able to extend out of the back side of the case 941 for hanging purpose and to retract inside the case 941 for the electronic apparatus 94, while maintaining in attractive appearance.

However, the prior art structures have something in common that either the hanging member 931 or the support post 961 is formed to be mushroom-shaped, which is for special use in mounting holes of varying size as shown. Obviously, the electronic apparatus is unable to be hung properly without the mounting rack.

SUMMARY OF THE INVENTION

An object of the present invention is to provide a hanging structure for adapting an apparatus to different hanging occasions.

According to the present invention, the hanging structure includes a first hanging member, and a second hanging member. A back bezel of an electronic apparatus includes an outer surface which is recessed with a bezel recess.

The first hanging member, movably arranged in the bezel recess, includes an ear-shaped hanging part which is axially recessed with an accommodating hole with a first guiding path at side face.

The first guiding path includes an axial segment and two positioning notches obliquely extending from the axial segment. The ear-shaped hanging part extends out of or retracts within the bezel recess by a predetermined distance in response to movement of the first hanging member.

The second hanging member, movably arranged in the accommodating hole, includes a main body and a mushroom-shaped hanging part, both of which are connected with each other. The main body, at its surface, includes a guiding protrusion which is movably arranged in the first guiding path of the first hanging member. The mushroom-shaped hanging part selectively extends out of the accommodating hole depending on which positioning notch the guiding protrusion moves into.

By means of the above design, an apparatus such as a display may be hung on a thin plate with the ear-shaped hanging part, on a mounting hole of a mounting rack with the mushroom-shaped hanging part, or even directly hung on a nail on a wall. Therefore, the present invention merits in adapting to several hanging occasions.

According to the present invention, the bezel recess may be recessed with a second guiding path at side face, and the ear-shaped hanging part may include a protrusion at outer surface of the tubular body movably arranged in the second guiding path. The second guiding path includes a guiding groove and a positioning slot which are communicated with each other. When the protrusion moves into the guiding groove, the ear-shaped hanging part extends out of the bezel recess and the first hanging member is rotatable. When the protrusion moves into the positioning slot, rotation of the first hanging member is restrained.

The first hanging member may further include a shaft member and a locking part, and that the bezel recess, at bottom face, is provided with a through hole. The ear-shaped hanging part, the shaft member, and the locking part are connected in orderly manner and the shaft member passes through the through hole. In such configuration, when the ear-shaped hanging part extends out of the bezel recess, the locking part axially locks at the back bezel for preventing the first hanging member from escaping far away from the bezel recess.

The hanging structure of the present invention may further include two elastomers interposed between the locking part and the back bezel and between the back bezel and the ear-shaped hanging part, respectively. As such, the first hanging member is automatically returnable due to opposite pre-forces from the elastomers.

There may also be an elasmoter interposed between the main body of the second hanging member and the bottom face of the accommodating hole, providing a pre-force for the second hanging member. The mushroom-shaped hanging part may include an operating notch in which an auxiliary tool such as a screwdriver may be inserted and rotated by users. The operating notch may be a "-" shaped notch.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
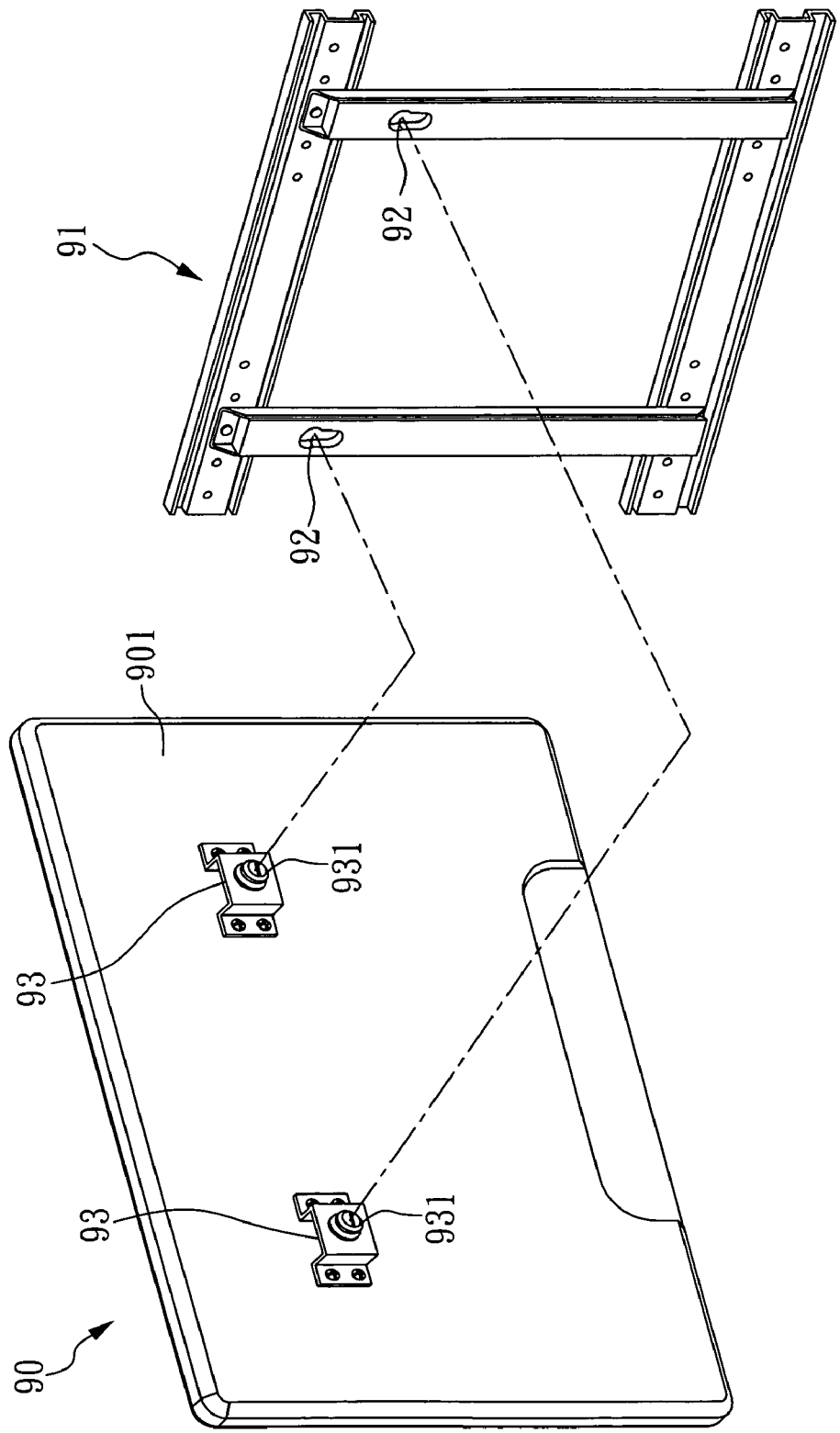
FIG. 1 is a perspective view of a display hanging structure according to a prior art.
Figure 2:
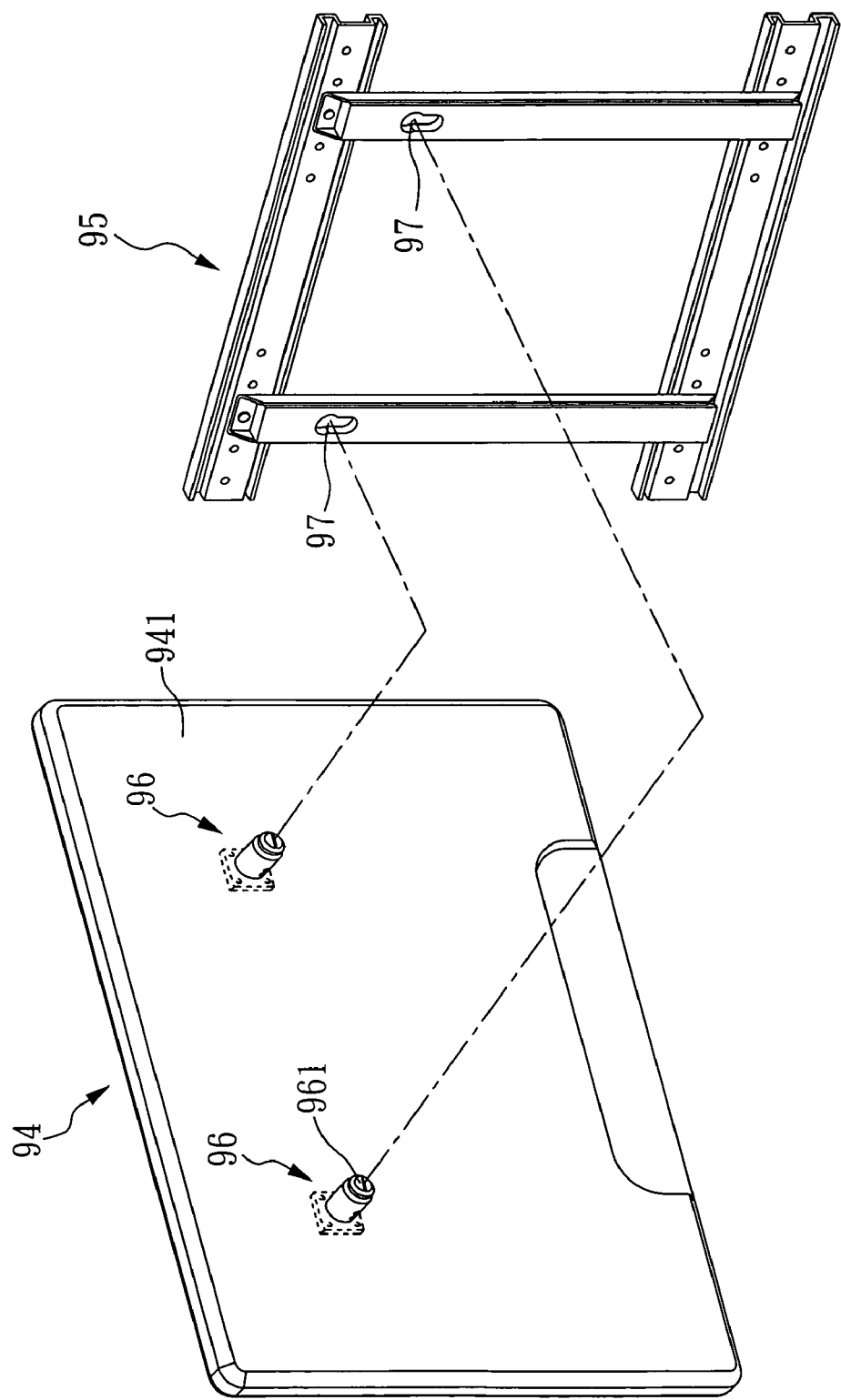
FIG. 2 is a perspective view of a display hanging structure according to another prior art.
Figure 3:
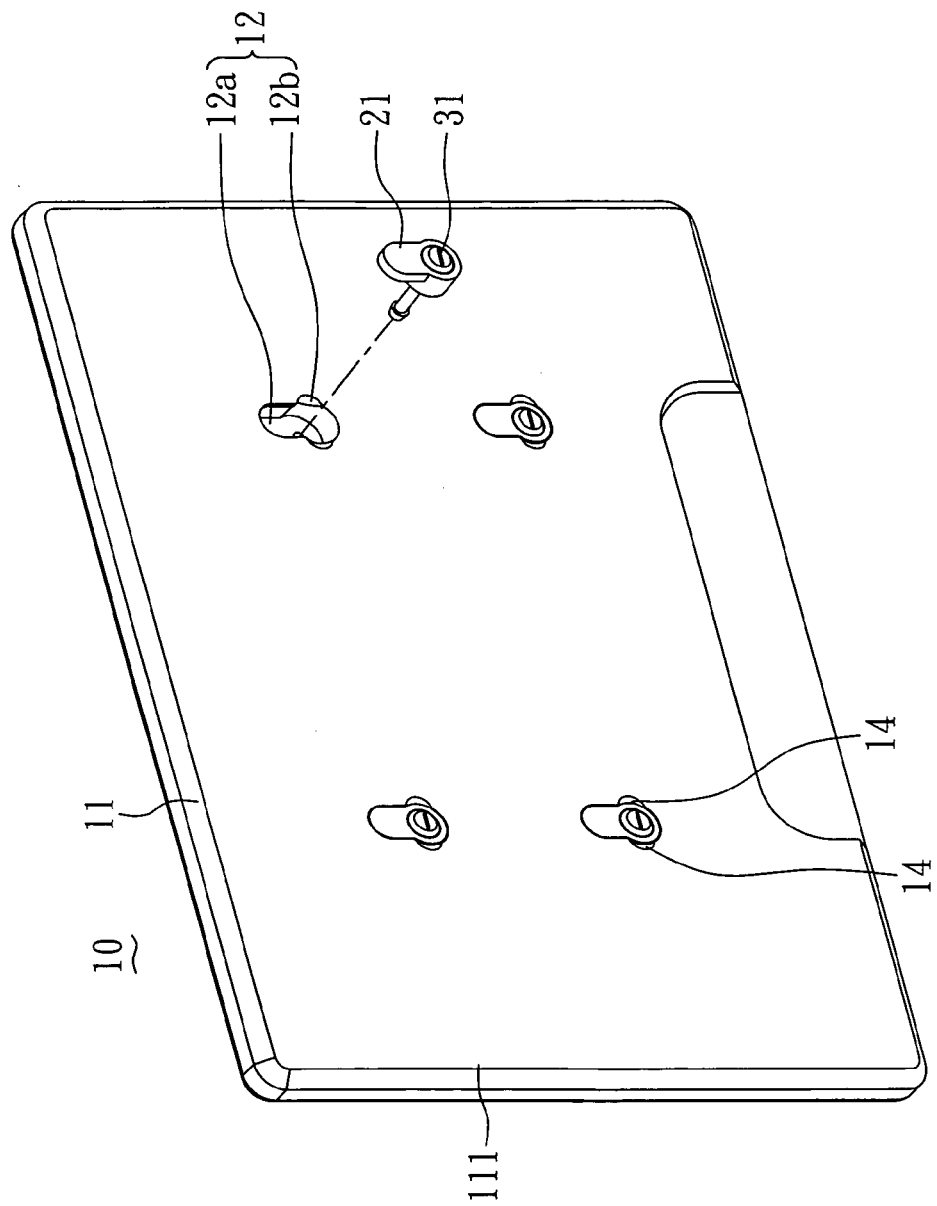
FIG. 3 is a perspective view illustrating a hanging structure installed in a display according to an embodiment of the present invention.
Figure 4:
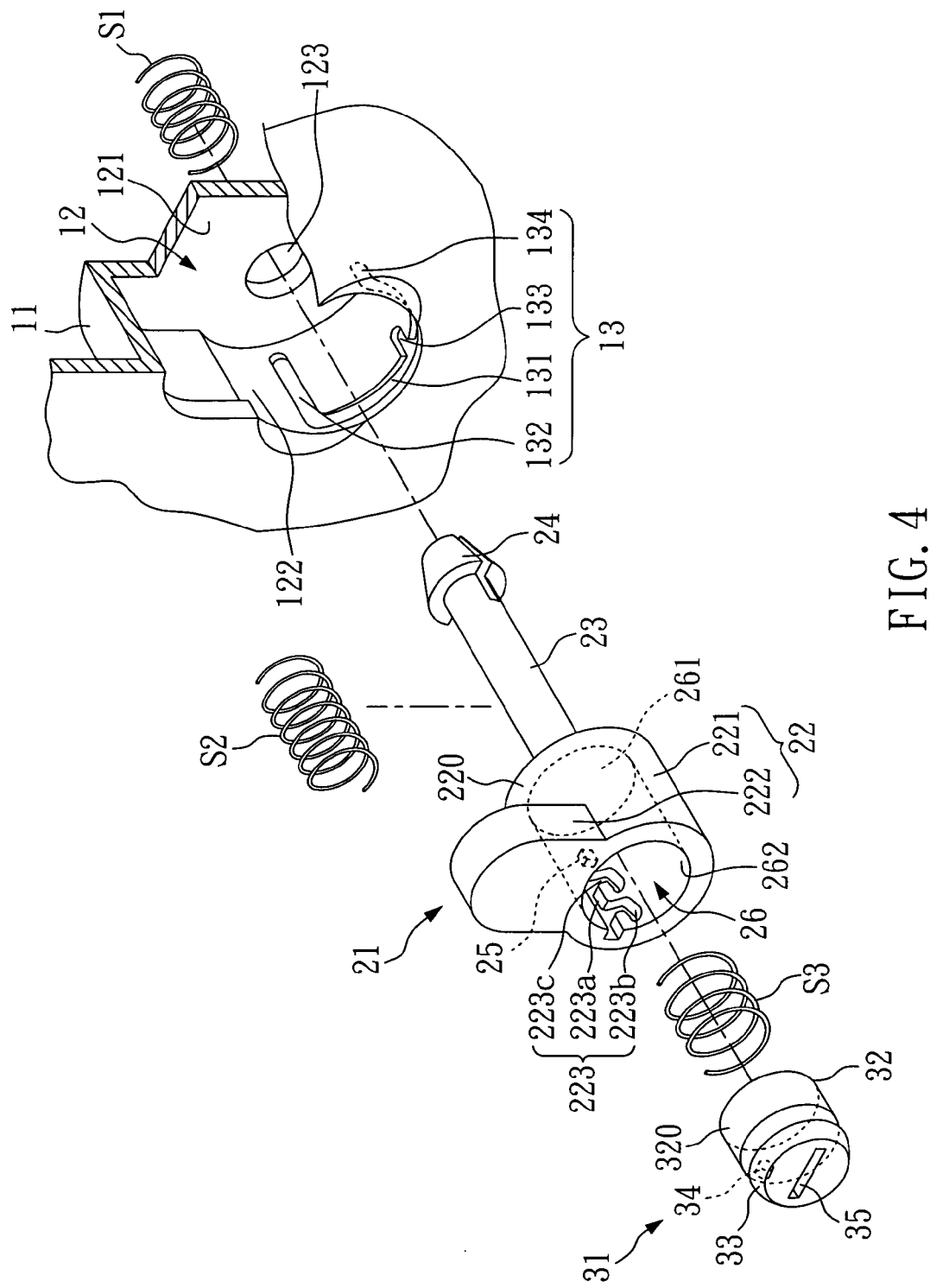
FIG. 4 is an exploded view illustrating the hanging structure in FIG. 3.

Referring to FIG. 3, a perspective view illustrating a hanging structure installed in a display according to an embodiment of the present invention; and FIG. 4, an exploded view of the hanging structure in FIG. 3; an LCD display 10 is shown and has four sets of hanging structures installed on a back bezel 11, each hanging structure comprising a first hanging member 21 and a second hanging member 31. The back bezel 11, at a portion of its outer surface 111, is recessed with a bezel recess 12 in which the first hanging member 21 is movably arranged inside. The second hanging member 31 is movably arranged in the first hanging member 21. The bezel recess 12 is divided into an upper recess 12a and a lower recess 12b.

The first hanging member 21 includes an ear-shaped hanging part 22, a shaft member 23, and a locking member 24 which are sequentially connected. The bezel recess 12 of the back bezel 11 is provided with a through hole 123 at a bottom face 121 for communicating an inner space 100 (shown in FIG. 5) within the LCD display 10 and the bezel recess 12 where the inner space 100 refers to a space accommodating display-associated electric components. The shaft member 23 of the first hanging member 21 passes through the through hole 123, and that the ear-shaped hanging part 22 and the locking part 24 are located in the bezel recess 12.

In the embodiment, the ear-shaped hanging part 22 includes a tubular body 221 with an accommodating hole 26 axially extending therein and a lug 222 extended from the rim of the tubular body 221. Profiles of the upper recess 12a and the lower recess 12b are designed to match the tubular body 221 and the lug 222 respectively with lower recess 12b slightly greater than the lug 222. As such, when the lug 222 is positioned in the lower recess 12b, there is still an operating clearance 14 (shown in FIG. 3) left for users to grip and pull the first hanging member 21 by hand.

An elastomer S1, a coil spring with greater diameter than the through hole 123 in the embodiment, is provided between the locking part 24 and the back bezel 11. The spring is wrapped around the shaft member 23 so as to remain in the inner space 100.

The bezel recess 12 is provided with a second guiding path 13 at side face 122. The second guiding path 13 includes a guiding groove 131 and three axially extending and spaced positioning slots 132, 133, and 134, where the guiding groove 131 is communicated with three positioning slots. The ear-shaped hanging part 22 has a protrusion 25 protruded from the outer surface 220 of tubular body 221 movable along the second guiding path 13.

An elastomer S2, a coil spring with greater diameter than the through hole 123 in the embodiment, is provided between the back bezel 11 and the ear-shaped hanging part 22 and also wrapped around the shaft member 23 as the elastomer S2 so as to remain in the bezel recess 12.

A first guiding path 223 is provided at side face 262 of the accommodating hole 26 of the first hanging member 21, and includes an axial segment 223a, a first positioning notch 223b and a second positioning notch 223c obliquely extending from the axial segment 223a.

The second hanging member 31 includes a main body 32 and a mushroom-shaped hanging part 33, both of which are connected with each other. A guiding protrusion 34, protruded from the surface 320 of the main body 32, is movable in the first guiding path 223. Between the main body 32 and the bottom face 261 of the accommodating hole 26 an elastomer S3 is provided for exerting a pre-force on the second hanging member 31.

The mushroom-shaped hanging part 33 of the second hanging member 31 is recessed with an operating notch 35 at top, a elongated slot shaped notch in the embodiment.

Figure 5:
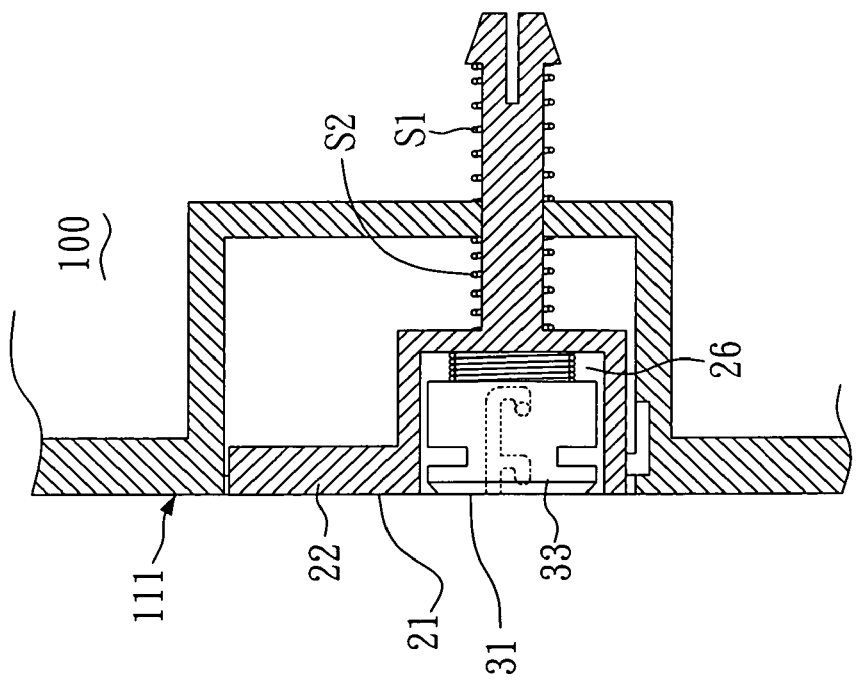
FIG. 5 is a partially cross-sectional view illustrating the display accompanied with a stand serving in standing mode in FIG. 3 according to the embodiment of the present invention.

FIGS. 5 to 8 illustrate different operating modes for the hanging structure of the present invention. Referring to FIG. 4 and FIG. 5, a cross-sectional view illustrating the display accompanied with a stand serving in standing mode in FIG. 3 according to the embodiment of the present invention; in this mode, when the hanging structure is not required the force exerting on the first hanging member 21 by the elastomer S1 counterbalances that by the elastomer S2 such that the mushroom-shaped hanging part 33 of the second hanging member 31 does not extend out of the accommodating hole 26 but aligns with the ear-shaped hanging part 22 of the first hanging member 21 and the ear-shaped hanging part 22 also aligns with the outer surface 111 of the back bezel 11 (Shown in FIG. 5). On the other hand, the protrusion 25 of the first hanging member 21 is located at the positioning slot 132 and the guiding protrusion 34 of the second hanging member 31 is located at the second positioning notch 223c. A stand 40 may be attached onto the bottom of the LCD display 10 such that a standing mode is achieved, as shown in FIG. 9.

Figure 6:
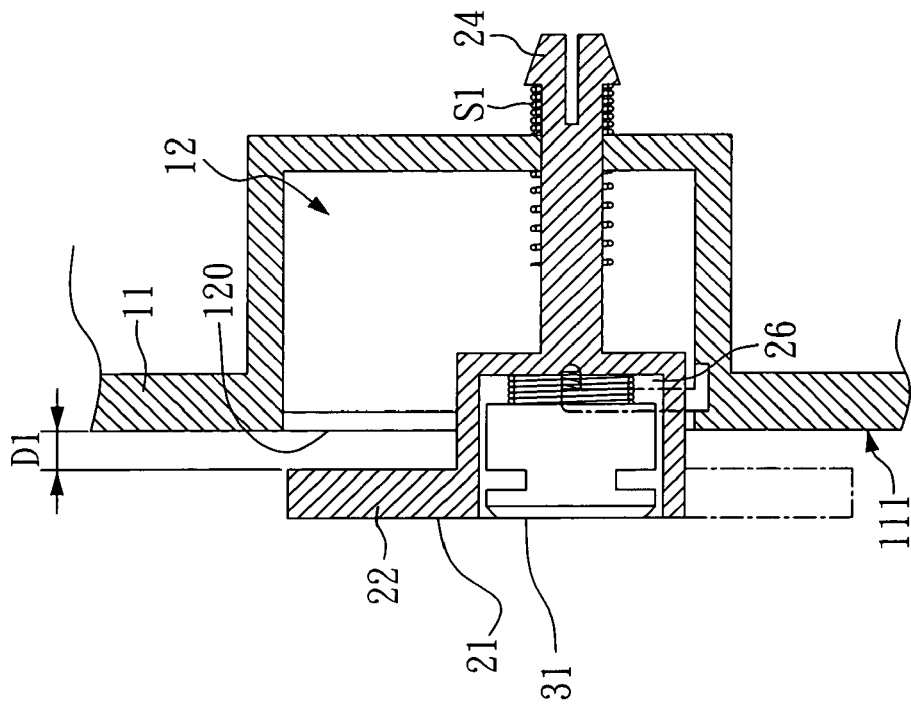
FIG. 6 is a partially cross-sectional view illustrating the display hung by a first hanging member in FIG. 3 according to the embodiment of the present invention.

Referring to FIG. 4 and FIG. 6, a cross-sectional view illustrating the display hung by a first hanging member in FIG. 3 according to the embodiment of the present invention; when the first hanging member 21 is pulled out by users until the a predetermined distance D1 between the ear-shaped hanging part 22 and a recess opening 120 (as well as outer surface 111 of the back bezel 11) is made, the locking part 24 along with the elastomer S1 abut and lock at the back bezel 11 such that the locking part 24 is axially limited by the back bezel 11. At this time, the second hanging member 31 remains hidden within the accommodating hole 26 and the protrusion 25 of the first hanging member 21 moves from the positioning slot 132 to the guiding groove 131. Depending on the extent of rotation for the first hanging member 21, the protrusion 25 can enter either the positioning slot 133 or the positioning slot 134.

Figure 10A:
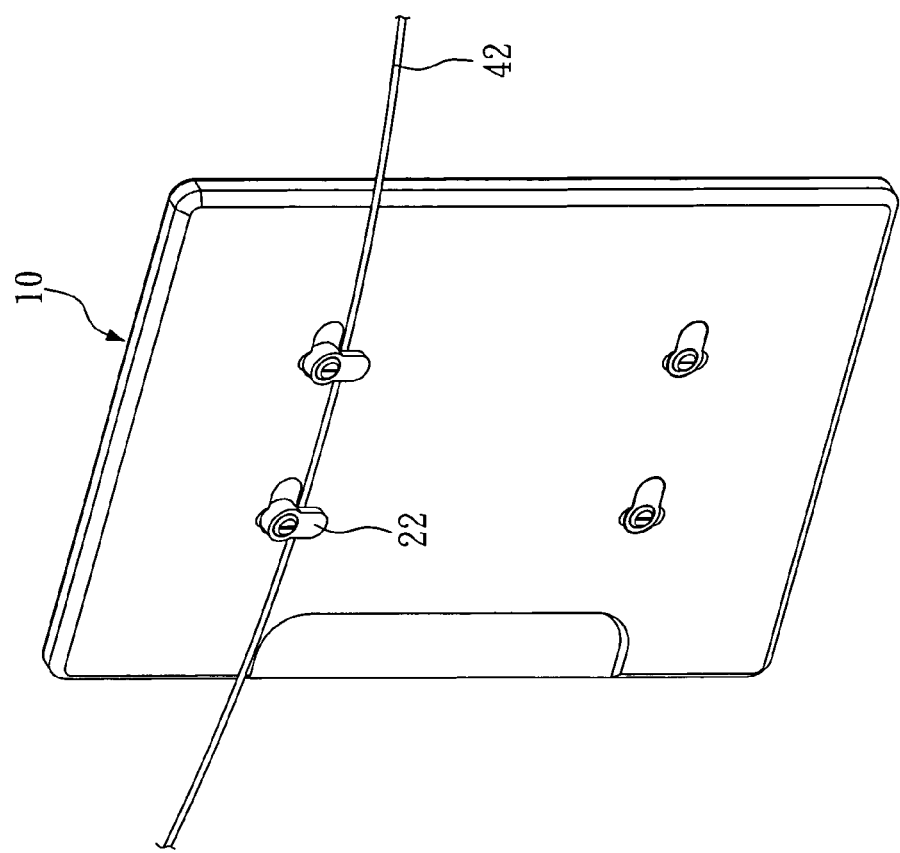
FIG. 10A is a perspective view illustrating the display hung vertically by the first hanging member in FIG. 3 according to the embodiment of the present invention.

In case of entering the positioning slot 133, which indicates a 90 degrees rotation for the first hanging member 21, as shown in FIG. 10A that the LCD display 10 is fully rotated by 90 degrees.

Figure 10B:
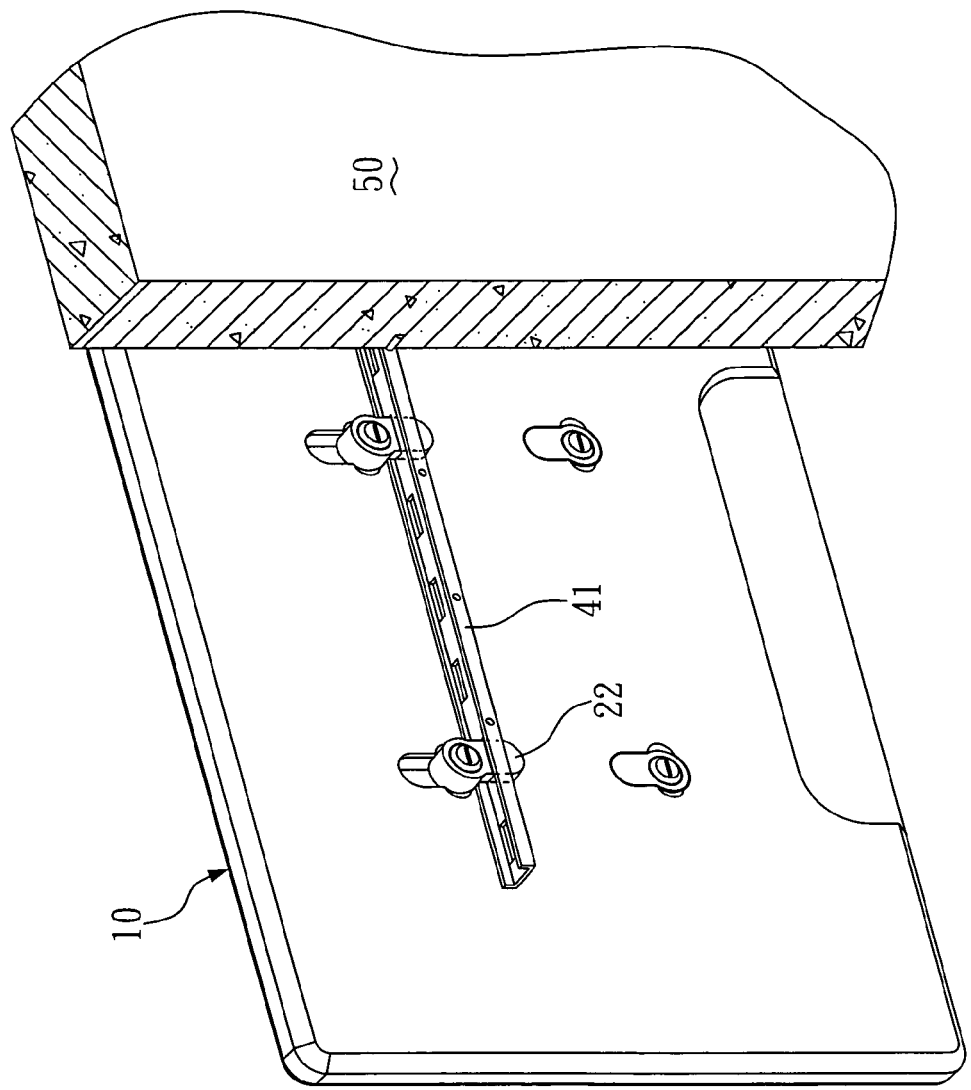
FIG. 10B is a perspective view illustrating the display hung by the first hanging member with a specific degree rotation in FIG. 3 according to the embodiment of the present invention.

In case of entering the positioning slot 134, which indicates a 180 degrees rotation for the first hanging member 21, as shown in FIG. 10B that the first hanging member 21 is fully rotated by 180 degrees in use.

Both the operating modes described above are in common that the first hanging member 21 hooks on a proper support such as a rope 42 or a thin plate 41 on a wall 50.

Figure 7:
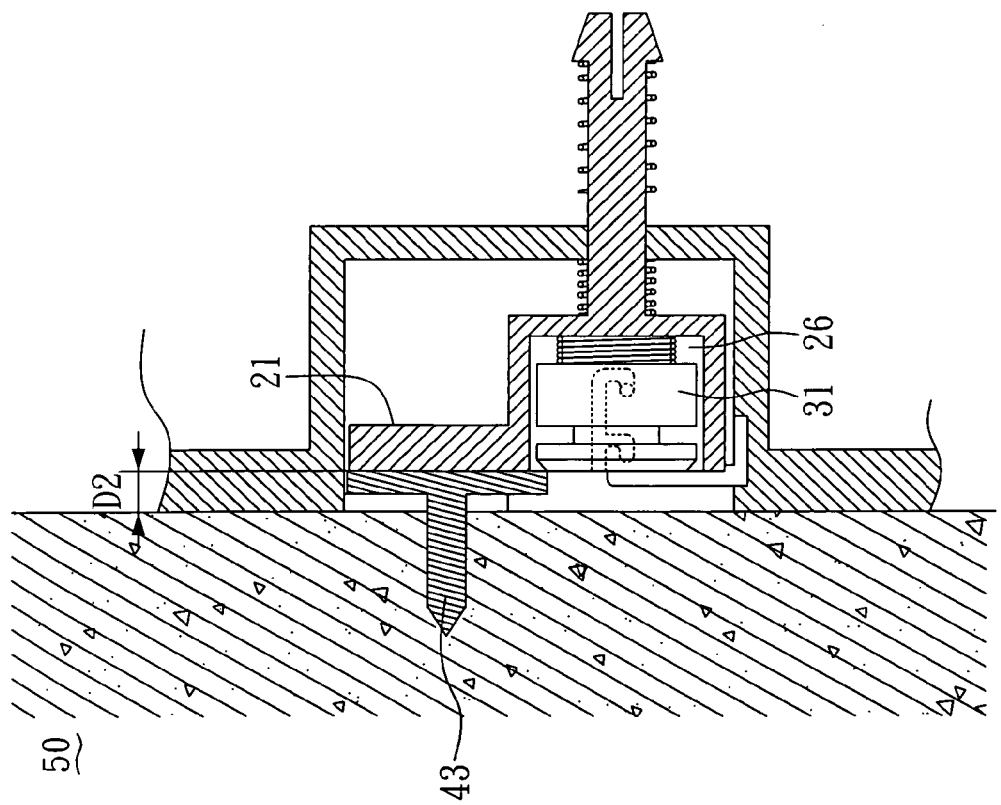
FIG. 7 is a partially cross-sectional view illustrating the display hung by a nail hit into a wall in FIG. 3 according to the embodiment of the present invention.
Figure 11:
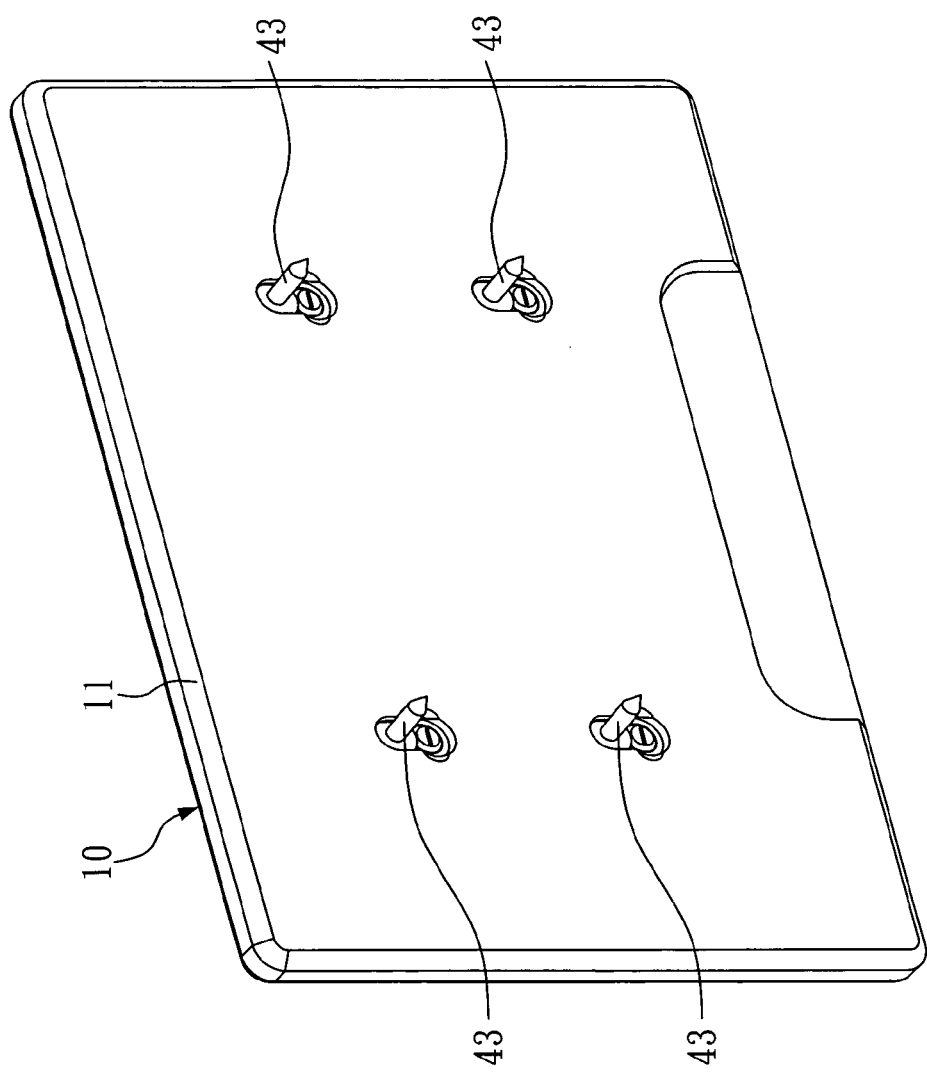
FIG. 11 is a perspective view illustrating the display hung by the nail on the wall in FIG. 3 according to the embodiment of the present invention.

Referring to FIG. 4 and FIG. 7, a cross-sectional view illustrating the display hung by a nail screwed on a wall according to the embodiment of the present invention; when the first hanging member 21 is pushed inward into the bezel recess 12 by an external tool with sufficient supporting strength such as a nail 43 on the wall 50 by a predetermined distance D2 where the second hanging member 31 remains hidden within the accommodating hole 26, the nail 43 offers the LCD display 10 a supporting force to be hung on the wall, as shown in FIG. 11.

Figure 8:
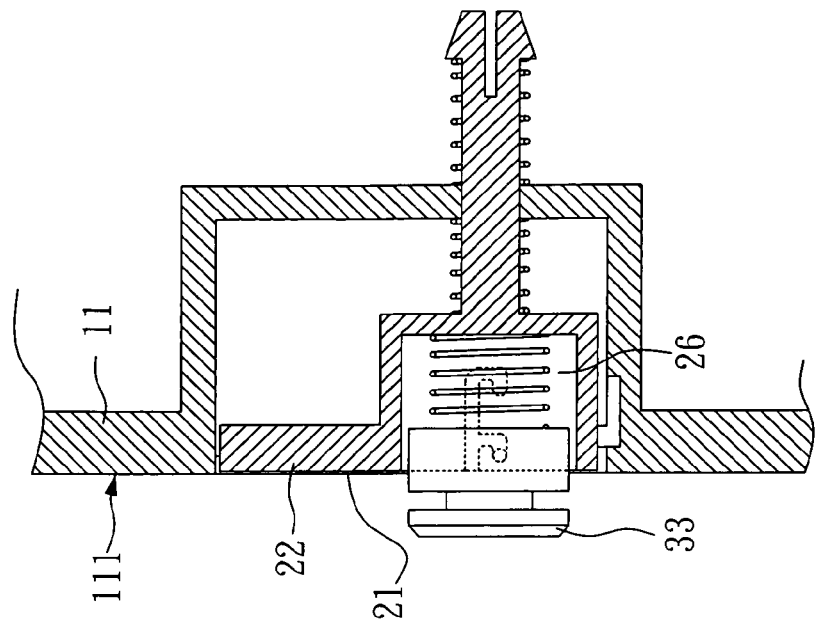
FIG. 8 is a partially cross-sectional view illustrating the display hung by a second hanging member in FIG. 3 according to the embodiment of the present invention.
Figure 9:
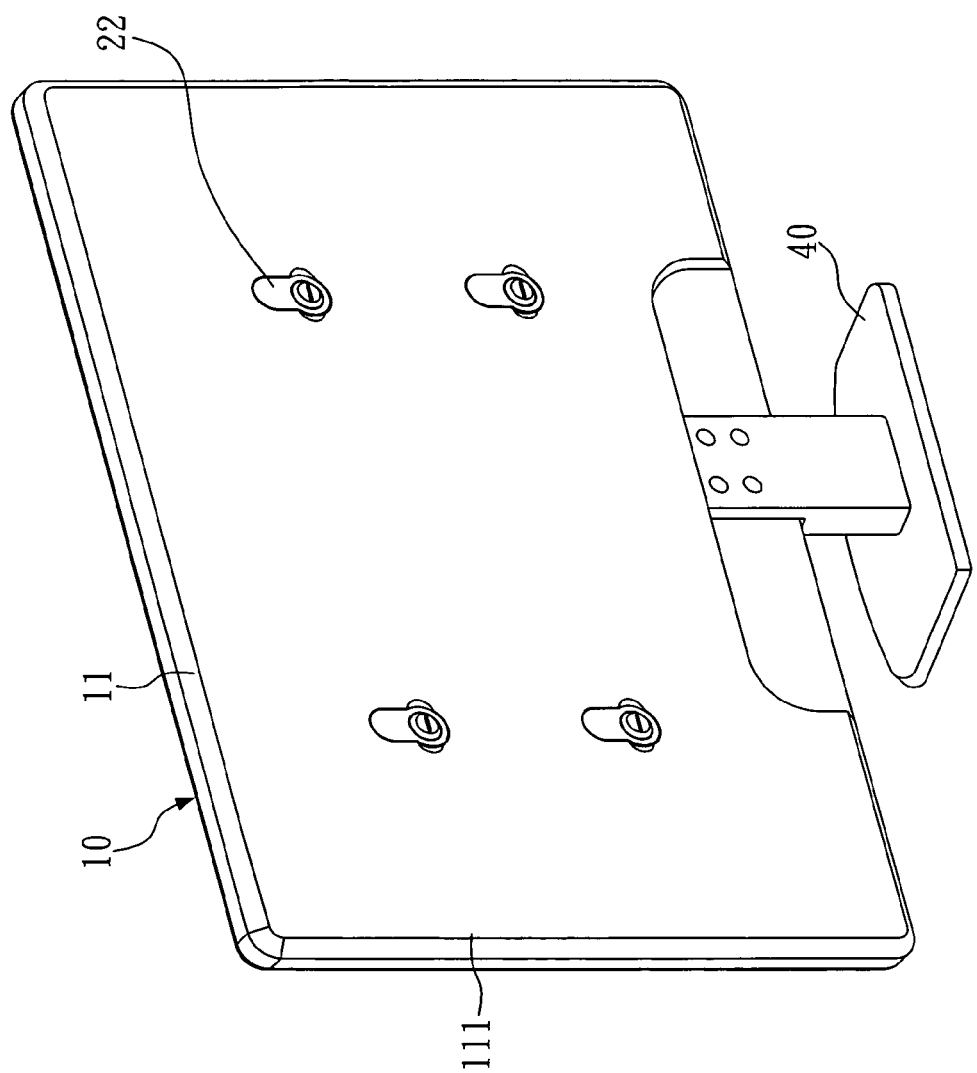
FIG. 9 is a perspective view illustrating the display accompanied with a stand serving in standing mode in FIG.3 according to the embodiment of the present invention.
Figure 12:
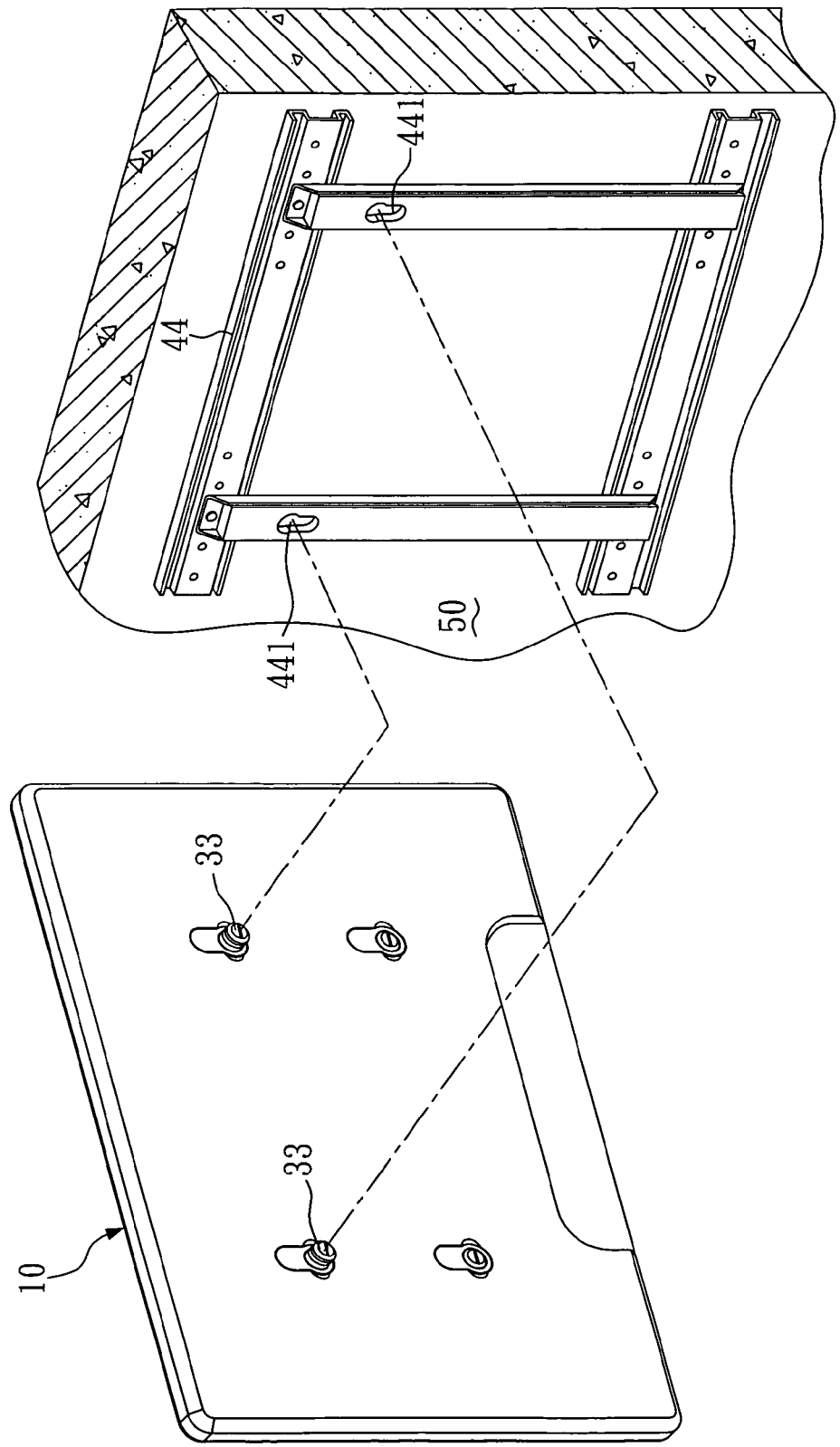
FIG. 12 is a perspective view illustrating the display hung by the second hanging member in FIG. 3 according to the embodiment of the present invention.

Referring to FIG. 4 and FIG. 8, a cross-sectional view illustrating the display hung by a second hanging member according to the embodiment of the present invention; in FIG. 8 the ear-shaped hanging part 22 of the first hanging member 21 is aligned with the outer surface 111 of the back bezel 11 and the operating notch 35 is rotated by an auxiliary tool such as a coin or a screwdriver inserting into therein such that the guiding protrusion 34 moves from the second positioning notch 223c, to the axial segment 223a, and finally to the first positioning notch 223b. Hereafter, the mushroom-shaped hanging part 33 of the second hanging member 31 changes to the state of extending out of the accommodating hole 26 and the LCD display 10 can be hung by aiming and inserting the mushroom-shaped hanging part 33 into a mounting hole 441 with varying size of a mounting rack 44 mentioned in prior art, as shown in FIG. 12.

It is therefore understood that the hanging structure of the present invention merits in selection between multiple hanging modes, that is hung on a mounting rack with holes of varying size, or hung on objects on a wall such as a thin plate, a rope or a nail. Moreover, when the apparatus is used in a standing mode through a stand, all hanging members are so properly stored inside the back bezel of the apparatus, which maintains attractive appearance of the apparatus.

Although the present invention has been explained in relation to its preferred embodiments, it is to be understood that many other possible modifications and variations can be made without departing from the scope of the invention as hereinafter claimed.

What is claimed is:

1. A hanging structure for hanging an electronic apparatus, comprising:
    a back bezel comprising an outer surface recessed with a bezel recess;
    a first hanging member movably arranged in the bezel recess and including an ear-shaped hanging part axially recessed with an accommodating hole with a first guiding path at side face, wherein the first guiding path includes an axial segment and two positioning notches obliquely extending from the axial segment and the ear-shaped hanging part extends out of or retracts within the bezel recess by a predetermined distance in response to movement of the first hanging member; and
    a second hanging member movably arranged in the accommodating hole and including a main body and a mushroom-shaped hanging part which are connected with each other, wherein the main body, at a surface thereof, includes a guiding protrusion which is movably arranged in the first guiding path of the first hanging member, when the guiding protrusion moves into one of the positioning notches, the mushroom-shaped hanging part extends out of the accommodating hole and when the guiding protrusion moves into the other positioning notch, the mushroom-shaped hanging part set inside the accommodating hole.

2. The hanging structure as claimed in claim 1, wherein the bezel recess is recessed with a second guiding path at side face including a guiding groove and a positioning slot which are communicated with each other and the ear-shaped hanging part includes a protrusion at outer surface movably arranged in the second guiding path, when the protrusion moves into the guiding groove, the ear-shaped hanging part extends out of the bezel recess and the first hanging member is rotatable, and when the protrusion moves into the positioning slot, rotation of the first hanging member is restrained.

3. The hanging structure as claimed in claim 1, wherein the first hanging member further includes a shaft member and a locking part, and that the bezel recess is provided with a through hole at bottom face where the ear-shaped hanging part, the shaft member, and the locking part are connected in orderly manner and the shaft member passes through the through hole such that the locking part axially locks at the back bezel when the ear-shaped hanging part extends out of the bezel recess.

4. The hanging structure as claimed in claim 3, further comprising two elastomers interposed between the locking part and the back bezel and between the back bezel and the ear-shaped hanging part, respectively.

5. The hanging structure as claimed in claim 1, further comprising an elastomer interposed between the main body of the second hanging member and the bottom face of the accommodating hole.

6. The hanging structure as claimed in claim 1, wherein the mushroom-shaped hanging part includes an operating notch.

7. The hanging structure as claimed in claim 6, wherein the operating notch is a elongated slot shaped notch.

* * * * *